US012794758B2

(12) United States Patent
Pattrick

(10) Patent No.: US 12,794,758 B2
(45) **Date of Patent: *Nov. 10, 2026**

(54) FAILURE DETECTION FOR PACKET TRANSMISSION IN SOFTWARE-DEFINED NETWORKS

(71) Applicant: Red Hat, Inc., Raleigh, NC (US)

(72) Inventor: Michael Pattrick, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/906,704

(22) Filed: Oct. 4, 2024

(65) Prior Publication Data

US 2025/0030591 A1 Jan. 23, 2025

Related U.S. Application Data

(63) Continuation of application No. 17/979,899, filed on Nov. 3, 2022, now Pat. No. 12,143,261.

(51) Int. Cl.
*H04L 41/0631* (2022.01)
*H04L 41/069* (2022.01)
*H04L 41/22* (2022.01)

(52) U.S. Cl.
CPC ........ *H04L 41/0631* (2013.01); *H04L 41/069* (2013.01); *H04L 41/22* (2013.01)

(58) Field of Classification Search
CPC .... H04L 41/0631; H04L 41/069; H04L 41/22
See application file for complete search history.

(56) References Cited

U.S. PATENT DOCUMENTS

| | | | |
|---|---|---|---|
| 9,755,969 B2 | 9/2017 | Agarwal | |
| 9,794,326 B1 * | 10/2017 | Vassallo | G06F 11/0784 |
| 9,876,704 B2 | 1/2018 | Sun et al. | |
| 10,033,607 B2 | 7/2018 | Badea et al. | |
| 10,097,402 B2 * | 10/2018 | Fedyk | H04L 41/046 |
| 10,200,279 B1 * | 2/2019 | Aljaedi | H04L 41/12 |
| 11,115,328 B2 | 9/2021 | K et al. | |
| 11,438,254 B2 | 9/2022 | C H et al. | |
| 2004/0015863 A1 * | 1/2004 | McBrearty | G06F 11/3636 717/124 |
| 2015/0039747 A1 * | 2/2015 | Meloche | H04L 43/04 709/224 |

(Continued)

OTHER PUBLICATIONS

U.S. Appl. No. 17/979,899 , "Non-Final Office Action", Mar. 14, 2024, 22 pages.

(Continued)

*Primary Examiner* — Nazia Naoreen
(74) *Attorney, Agent, or Firm* — Kilpatrick Townsend & Stockton LLP

(57) ABSTRACT

A system can be provided that can detect a transmission failure of a packet. The transmission failure can occur in a software-defined network. The system can further identify, via debuggers, functions associated with the transmission failure of the packet. The transmission failure of the packet can occur between components in the software-defined network. Additionally, the system can generate, via the debuggers, log data for the functions. The system can also identify, based on the log data, a function associated with the transmission failure and a cause of the transmission failure related to the function.

20 Claims, 3 Drawing Sheets

(56) References Cited

U.S. PATENT DOCUMENTS

| | | | |
|---|---|---|---|
| 2021/0144091 A1 | 5/2021 | C H et al. | |
| 2022/0166660 A1* | 5/2022 | Hull | G06F 11/327 |
| 2024/0154854 A1 | 5/2024 | Pattrick | |

OTHER PUBLICATIONS

U.S. Appl. No. 17/979,899 , "Notice of Allowance", Jul. 17, 2024, 8 pages.

Ohri , et al., "Software-Defined Networking Security Challenges and Solutions: A Comprehensive Survey", International Journal of Computing and Digital Systems, vol. 12, No. 1, Jul. 20, 2022, pp. 383-400.

* cited by examiner

FAILURE DETECTION FOR PACKET TRANSMISSION IN SOFTWARE-DEFINED NETWORKS

CROSS REFERENCE TO RELATED APPLICATION

This application is a continuation of and claims priority to U.S. application Ser. No. 17/979,899, titled, "Failure Detection for Packet Transmission in Software Defined Networks," filed Nov. 3, 2022, the entirety of which is incorporated herein by reference.

TECHNICAL FIELD

The present disclosure relates generally to software-defined networking and, more particularly (although not necessarily exclusively), to failure detection for packet transmission in software-defined networks.

BACKGROUND

Software-defined networks (SDN) are adaptable network architecture that can support applications requiring high bandwidth. SDN can use software-based controllers or application programming interfaces to communicate with underlying hardware infrastructure and direct information on a network. In SDN architectures, network control functions can be separate from data forwarding functions. This separation can enable directly programmable network control functions and abstraction of the network infrastructure for network applications and services. Administrators of SDN Networks can leverage the separation of network control from data forwarding to dynamically adjust traffic flow in the network. Further, administrators may configure network controllers using open source SDN programs. The use of these programmable open-source software-based controllers can simplify network design and operation.

DETAILED DESCRIPTION

Figure 1:
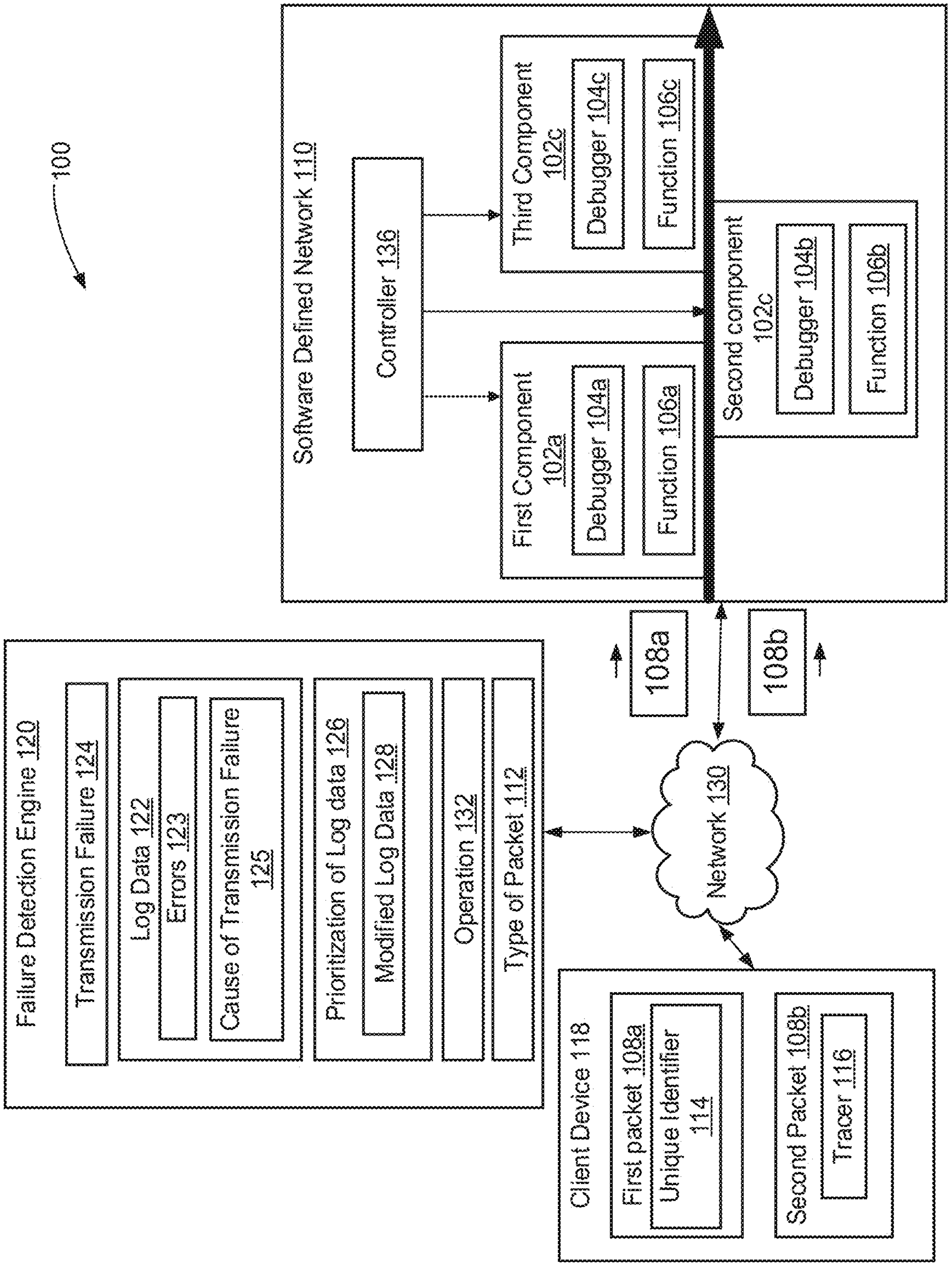
FIG. 1 is a block diagram of an example of a system that can detect transmission failure of a packet in a software-defined network according to one example of the present disclosure.

Software-defined networks (SDN) can include components that configure and control how packets (e.g., segments of data) are transformed and flow to their final destination. Examples of components can include applications that can communicate requests for information, controllers that can determine packet routes to provide the information, and networking devices that can implement the packet routes. In some examples, processing of a packet at a component, transmission of the packet between components, or other suitable aspects of packet flow in the SDN may exhibit unexpected behavior. For example, the packet may not reach an intended destination or the packet may be transformed incorrectly at a component. It can be difficult to determine the component or other aspect of the SDN that is causing the unexpected behavior. For example, packet counters can confirm whether a packet is received at a component to determine where a packet may have been lost in the SDN. But, this may not be sufficient information for determining a cause of the missing packet. For example, a packet counter may aid in determining that a software switch is not allowing a packet to get to the correct port. But, it may be difficult or impossible to determine if this is due to a bug in the software switch, the controller that configured the packet, a hardware issue for the computing device, or a security policy. This is further compounded by the fact that an SDN may include a unique combination and configuration of various components, and can include software installed across multiple servers. Analyzing configuration files for controllers or other suitable components of the SDN can be a time-consuming, complicated process that may require expertise about the many components used throughout the SDN. And, as the SDN can include components maintained by different entities, the configuration files for certain components may not be available to a user attempting to determine the cause of the unexpected behavior. This can limit detection and diagnosis of unexpected behavior of packets in the SDN.

Some examples of the present disclosure can overcome one or more of the abovementioned problems by using debuggers in the SDN to detect transmission failure of the packet and determine a cause of the transmission failure. The debuggers may trace or otherwise identify the packet during transmission to locate components at which the transmission failure occurred. The debuggers may identify functions associated with transmission or processing of the packet at the components by inspecting software underlying the components. The debuggers may use debugging symbols to inspect the software. The debugging symbols can be defined in a debugging symbol table that can map instructions, such as actions performed by a program, to corresponding variables, functions, or lines in source code. The debugging symbols or debugging symbol table can be stored as publicly available files. In contrast, configuration files or the source code itself may not be publicly available. Therefore, the debuggers can enable the system to analyze software for components maintained by different entities. Moreover, the debugging symbols can be well-known or well-defined in the debugging symbol table, which can decrease the requirement for expertise to analyze the many components used throughout the SDN.

Additionally, the debuggers can generate log data for the identified functions, which can be used to determine a cause of the transmission failure. The log data generated for each of the identified functions can include a function name, a time, and a thread associated with the function. The thread can be a series of functions that can execute concurrently with one or more additional series of functions to implement a process, such as packet transmission. Therefore, the log data can indicate actions performed by the functions as provided by the function names and can indicate an order in which the actions occur as given by the times. Additionally, the log data can indicate whether the functions execute in a same or different threads. For example, a process for handling packets may have a thread for when a packet is received and a second thread for when a packet is transmitted. The system can display the log data for a user to enable the user to identify errors. In some examples, the system can detect errors in the log data. For example, the system may detect that an order of the functions is incorrect. In another example, an error detected by the system can be a function that should not be executed with respect to packet transmission. Thus, the system can locate, identify, and diagnose the transmission failure in an efficient manner such that the cause of transmission failure can be resolved quickly to improve operation of the SDN.

In a particular example, the system may detect transmission failure of the packet in the SDN between a software switch component and a virtual private network (VPN) component. Scriptable debuggers, such as GNU debugger (GDB) or python debugger (PDB), can be paired with the software switch and the VPN. The debugger may identify functions associated with the transmission failure of the packet by inserting a tracer, which can be a snippet of code, into the packet for detection by the debugger in the functions. The debugger may identify a first function and associated with the software switch and a second function associated with the VPN.

Additionally, the system can generate log data for the first function and log data for the second function. The log data can include a first thread associated with the first function. The first thread can typically be used to prepare packets for transmission. A second thread associated with the second function can be used to receive or drop packets. In some examples, the packet may need to be encapsulated to be received by the VPN. Therefore, the first function can be a function for adding a header and possibly a footer to the packet to encapsulate the packet. Because the log data includes a record of the second function, as indicated by the second thread, dropping the packet rather than receiving the packet, the system can determine that the first function does not properly encapsulate the packet.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 that can detect transmission failure 124 of a packet in a software-defined network (SDN) 110 according to one example of the present disclosure. In some examples, packets 108*a-b* can be transmitted from a client device 118 via one or more networks 130, such as the Internet. The packets 108*a-b* can further be received by a controller 136 to determine a packet route for the packets 108*a-b*. In an example, the client device 118 can transmit a first packet 108*a*. The first packet 108*a* can be a login request to access a particular application and can include authorization data such as a username and password. The controller 136 can receive the first packet 108*a* and direct the first packet 108*a* to a packet route for validating the authorization data to provide the client device 118 with access to the application.

The SDN 110 can include components 102*a-c*, which can perform operations on packets 108*a-b* to implement the packet route determined by the controller 136. The components 102*a-c* can be routers, software switches, hardware switches, virtual private networks, or the like. The operations can include the components 102*a-c* forwarding the packets 108*a-b* to a port, to a controller 136, between the components 102*a-c*, etc. Additionally, the operations may include the components 102*a-c* encapsulating the packets 108*a-b*, dropping the packets 108*a-b*, transforming the packets 108*a-b*, or other suitable operations. Encapsulating the packets 108*a-b* can include generating a header for a packet to indicate a beginning of the packet and possibly generating a footer to indicate an end of the packet. In some examples, the operations can further include decapsulating the packets 108*a-b* as the packets 108*a-b* reach a destination, such as one of components 102*a-c*. Decapsulation of the packet can provide a segment of data within the packet in its original form.

For example, validating the authorization data in the first packet 108*a* can involve multiple operations. The first packet 108*a* may be encrypted, so the first operation may involve decryption of the first packet 108*a* at the first component 102*a*. Decrypting the first packet 108*a* may allow the SDN 110 to access the username and password in the first packet 108*a*. Once decrypted, the first component 102*a* can transmit the first packet 108*a* to the second component 102*b*. The second component 102*b* may validate the authorization data by comparing the authorization data in the first packet 108*a* to stored authorization data in the second component 102*b*. If the authorization data is validated (e.g., the username and password are correct), the second component 102*b* can transmit the first packet 108*a* to the third component 102*c* that can communicate with the application to permit the client device 118 to access the application. As the validation process involves multiple steps and components, transmission failure of the first packet 108*a* is possible.

To identify and diagnose transmission failures 124 of packets 108*a-b* between components 102*a-c*, the system 100 can include a failure detection engine 120. For example, the failure detection engine 120 can detect the transmission failure for the first packet 108*a*. The failure detection engine 120 may detect the transmission failure by detecting that the client device 118 does not receive access to the application with authorized login information. There are many potential transmission failures 124 that can occur, including routing of the packets 108*a-b* to an incorrect component, dropping of the packets 108*a-b* prior to the packets 108*a-b* reaching a component, unintended modifications to the packets 108*a-b* during transmission, or other suitable errors during transmission of the packets 108*a-b*. A cause of transmission failure 125 can be a bug in the one or more of the components 102*a-c*, a bug in the controller 136, or another suitable cause of error associated with the SDN 110.

To identify causes of the transmission failure of the first packet 108*a*, the failure detection engine 120 may further identify, via debuggers 104*a-c*, functions 106*a-c* associated with the transmission failure 124 of the first packet 108*a* between components 102*a-c* in the SDN 110. The debuggers 104*a-c* can be computer programs for inspecting and identifying errors in other computer programs. Examples of debuggers 104*a-c* can include a GNU debugger (GDB), a python debugger (PDB), or a tracing framework like DTrace. In some examples, debuggers 104*a-b* can inspect functions 106*a-c* by the system 100 or a user implementing software breakpoints or hardware breakpoints. The hardware breakpoints can be implemented at the hardware level such that an instruction in the functions 106*a-c* can automatically trigger debugging by the debuggers 104*a-c*. The software breakpoints can be implemented at the software level by patching code in the functions 106*a-c* with an instruction to trigger debugging by the debuggers 104*a-c*. Additionally, program code underlying the functions 106*a-c* can be created with slots, which can be space in the program code for receiving additional code. Therefore, an instruction to trigger debugging by the debuggers 104*a-c* can be implemented in the slots to efficiently analyze the functions 106*a-c*.

The debuggers 104*a-c* can be paired with the components 102*a-c* to identify the functions 106*a-c*. The debuggers 104*a-c* can identify the functions 106*a-c* by inspecting the functions 106*a-c* for data structures or other suitable identifiers. The debuggers 104*a-c* may use debugging symbols to inspect the software. The debugging symbols can be defined in a debugging symbol table that can map instructions, such as actions performed by a program, to corresponding variables, functions, or lines in source code. The data structures or other suitable identifiers can indicate a relationship between the packets 108*a-b* and the functions 106*a-c*. For example, a packet buffer can be a data structure detected by the debuggers 104*a-c*. The packet buffer can be memory space set aside to enable components 102*a-c* to receive or store the packets 108*a-b*. The debuggers 104*a-c* can detect, for example, that functions 106*a-c* include the packet buffer to determine functions 106*a-c* may be associated with the transmission failure 124.

Additionally, or alternatively, the system 100 may track the packets 108*a-b* to determine which of the components 102*a-c* can be responsible for the transmission failure 124. In some examples, the system 100 can track the packets 108*a-b* by the debuggers 104*a-c* detecting the packets 108*a-b* at each of the components 102*a-c* within a predetermined amount of time. For example, a first debugger 104*a* can detect the unique identifier 114 associated with a second packet 108*b* at a first component 102*a* and a second debugger 104*b* can detect the unique identifier 114 at a second component 102*b*. A third debugger 104*c* may not detect the unique identifier 114 at a third component 102*c* within the predetermined amount of time, which can indicate a transmission failure 124 between the second component 102*b* and the third component 102*c*. Thus, the system 100 may determine that the cause of the transmission failure 125 is related to the second component 102*b*, the third component 102*c*, or communication between the second component 102*b* or the third component 102*c* and the controller 136. In response, the system 100 may generate log data 122 for functions 106*b-c* associated with the components 102*b-c* rather than for all components 102*a-c*. The log data 122 can include data characterizing the function, data associated with execution of the function, or other suitable data.

Additionally, in some examples, a set of data or other suitable information transmitted over the SDN 110 can be divided into packets 108*a-b*. The packets 108*a-b* can each be a particular type of packet 112, and the system 100 may detect transmission failure 124 for the type of packet 112. For example, the failure detection engine 120 can detect the transmission failure 124 of the first packet 108*a*. In response, the system 100 may insert a tracer 116, such as a segment of code, into a second packet 108*b*. In some examples, the second packet 108*b* may be similar or substantially identical to the first packet 108*a*. The debuggers 104*a-c* can detect the tracer 116 in functions 106*a-c* to determine that functions 106*a-c* are associated with the transmission failure 124 of the type of packet 112. For example, the first debugger 104*a* can be paired with the first component 102*a* and the first debugger 104*a* can detect the tracer 116 in the first function 106*a*. The second debugger 104*b* can be paired with the second component 102*b* and can also detect the tracer 116 in the second function 106*b*. Additionally, the third debugger 104*c* can be paired with the third component 102*c* and can detect the tracer 116 in the third function 106*c*. Thus, the debuggers 104*a-c* can detect that components 102*a-c* are associated with the transmission failure 124 of the type of packet 112. In response to the debuggers 104*a-c* detecting the tracer 116, log data 122 can be generated for each of the functions 106*a-c*.

The system 100 may also identify the functions 106*a-c* associated with the transmission failure 124 by tracing the packets 108*a-b*. For example, for the transmission failure 124 associated with the authorization request from the client device 118, the first packet 108*a* may be traced by the pairing the debuggers 104*a-c* with components 102*a-c*. The first packet 108*a* can have the unique identifier 114, which can be a particular segment of code. The debuggers 104*a-c* can detect the unique identifier 114 in functions 106*a-c* to determine that the functions 106*a-c* are associated with the transmission failure 124. In response to debuggers 104*a-c* detecting the unique identifier 114, log data 122 can be generated for each of the functions 106*a-c*.

The log data 122 can be used to identify the cause of transmission failure 125 for the first packet 108*a*. In some examples, the cause of transmission failure 125 can be a hardware issue, such as a malfunctioning hardware switch or router, a software issue, such as a bug in the controller 136 or a bug in any of the components 102*a-c*, or a flawed security policy. The log data 122 can include, for each of the functions 106*a-c* identified by the debuggers 104*a-c*, a function name, a time, and a thread. The function name may indicate actions performed by the functions 106*a-c*. The time can be a timestamp for when the functions 106*a-c* were logged, which can be indicative of when the function executes. Additionally, a set of threads can execute functions 106*a-c* concurrently to perform a process, therefore the log data 122 can include a particular thread for each of the functions 106*a-c*.

In the log data 122, a function name for a first function 106*a* can indicate that it is related to decrypting the first packet 108*a*. A function name for a second function 106*b* can indicate that it is related to comparing the decrypted authentication data in the first packet 108*a* to stored authentication data. Additionally, a function name for a third function 106*c* can indicate that it is related to storing the first packet 108*a* for permitting access to the client device 118 for a time that the first packet 108*a* is stored. Additionally, a process for granting access to the client device 118 can have a first thread associated with authorized data and a second thread associated with unauthorized data. The log data 122 can provide the first thread for the first function 106*a* and the second function 106*b* and can provide the second thread for third function 106*c*. Moreover, times in the log data 122 can indicate that the functions 106*a-c* executed in an expected order with the first function 106*a* first and the third function 106*c* last.

In some examples, the log data 122 can be aggregated, sorted, or a combination thereof in a centralized location, such as the failure detection engine 120. In some examples, the log data 122 can be displayed on a client device 118 for a user. The failure detection engine 120 can analyze the log data 122 to identify errors 123 associated with the functions 106*a-c*. For example, the log data 122 for the second function 106*b* associated with the second component 102*b* can include the first thread. The failure detection engine 120 can therefore determine that the authentication data in the first packet 108*a* matched the stored authentication data. But, the log data 122 for the third function 108*c* can include the second thread, which is associated with unauthorized data. The failure detection engine 120 can identify the second thread as the error 123, as threads for subsequent executions of the second function 106*b* and the third function 106*c* should match to allow the third function 106*c* to permit or deny the client device 118 access to the application based on the second function 106*b*.

The failure detection engine 120 can identify the errors 123, such as unexpected mismatching of threads, by accessing a lookup table with the errors 123. The lookup table may further associate the errors 123 with causes of transmission failure. Thus, the failure detection engine 120 may automatically determine the cause of transmission failure 125 by identifying the cause of transmission failure 125 associated with the error 123 in the lookup table. For example, for the error of the second function 106*b* and the third function 108*c* having different threads in the log data 122, the lookup table can list the cause of transmission failure 125 as a bug in second component 102*b*. The bug in the second component 102*b* can be causing loss of packet data, which may prevent the third component 102*c* from receiving the first packet 108*a* after validation at the second component 102*b*.

In some examples, the failure detection engine 120 may determine a prioritization of log data 126 based on the cause of transmission failure 125. The sets of log data or the types of log data that can be the errors 123 can be highlighted, reorganized, reformatted, or otherwise prioritized to generate modified log data 128. For example, the failure detection engine 120 may determine, based on the lookup table, log data 122 that is most relevant to the errors 123 to generate the modified log data 128. The modified log data 128 can be displayed to a user via the client device 118 to enable a user to quickly identify the cause of transmission failure 125.

In some examples, the failure detection engine 120 may determine, based on the cause of transmission failure 125, at least one operation 132 that can be used to resolve the cause of transmission failure 125. For example, the operation 132 can be based on historical data indicating a resolution for a related cause of transmission failure or a set of rules for resolving types of transmission failures. The operation 132 can be displayed for the user via client device 118. In some examples, the operation 132 can be automatically implemented by the controller 136 or components 102*a-c*. For example, if the error 123 is the bug detected in the second component 102*b*, the failure detection engine 120 may automatically communicate operations to the controller 136 to reroute the validated first packet 108*a* to an alternate component that can provide the client device 118 with permissions for accessing the application.

Although FIG. 1 depicts a certain number and arrangement of components, this is for illustrative purposes and intended to be non-limiting. Other examples may include more components, fewer components, different components, or a different arrangement of the components shown in FIG. 1.

Figure 2:
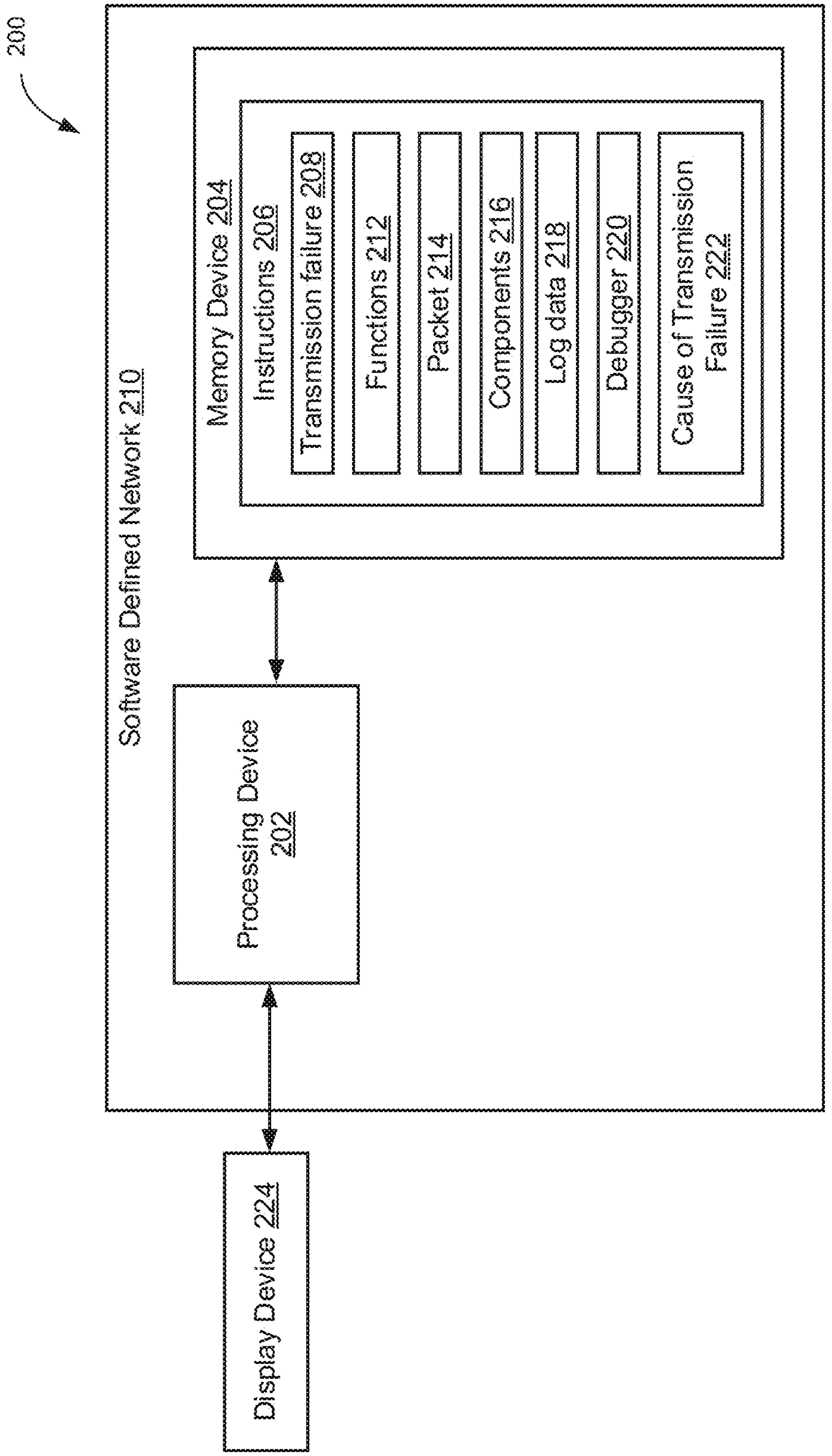
FIG. 2 is a block diagram of an example of a computing device that can detect transmission failure of a packet in a software-defined network according to one example of the present disclosure.

FIG. 2 is a block diagram of an example of a computing environment 200 that can detect transmission failure of a packet 214 in a software-defined network 210 according to one example of the present disclosure. The computing environment 200 includes a processing device 202 communicatively coupled to a memory 204. The processing device 202 can include one processing device or multiple processing devices. Non-limiting examples of the processing device 202 include a Field-Programmable Gate Array (FPGA), an application-specific integrated circuit (ASIC), a microprocessor, etc. The processing device 202 can execute instructions 206 stored in the memory 204 to perform the operations. In some examples, the instructions 206 can include processor-specific instructions generated by a compiler or an interpreter from code written in any suitable computer-programming language, such as C, C++, Python, Java, etc.

Memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processing device 202 can read instructions 206. A computer-readable medium can include electronic, optical, magnetic, or other storage devices capable of providing the processing device 202 with computer-readable instructions 206 or other program code. Examples of a computer-readable medium can include magnetic disks, memory chips, ROM, random-access memory RAM, an ASIC, a configured processor, optical storage, or any other medium from which a computer processor can read instructions 206.

The processing device 202 can execute instructions 206 to detect transmission failure 208 of a packet 214 in a software-defined network (SDN) 210. The processing device 202 may further identify functions 212 associated with the transmission failure 208 of the packet 214 between components 216 in the SDN 210. Additionally, the processing device 202 can generate, via at least one debugger 220, log data 218 for the functions 212. The processing device 202 can also identify, based on the log data 218, a cause of the transmission failure 222 related to the functions 212. In some examples, the processing device 202 may further display on a display device 224 for a user the log data 218, the cause of transmission failure 222, other suitable information related to the packet 214, the SDN 210, components 216, etc.

Figure 3:
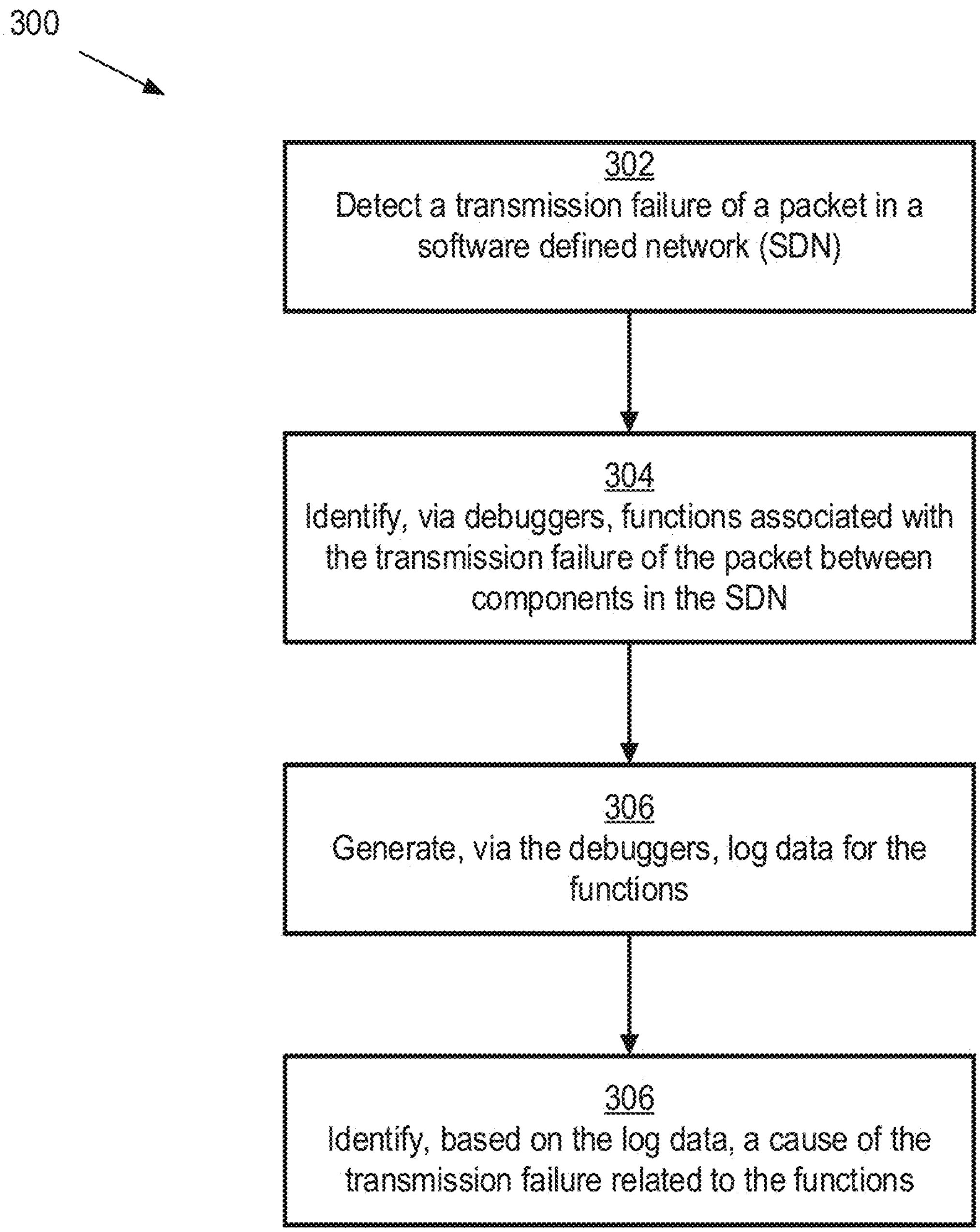
FIG. 3 is a flowchart of a process for detecting transmission failure of a packet in a software-defined network according to one example of the present disclosure.

FIG. 3 is a flowchart of a process 300 for detecting transmission failure 124 of a packet in a software-defined network (SDN) 110 according to one example of the present disclosure. In some examples, the processing device 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 1.

At block 302, the processing device 202 can detect the transmission failure 124 of a first packet 108*a* in the SDN 110. For example, a client device 118 can experience high latency for uploading data to a data repository associated with the client device 118. The high latency can cause packet loss over the SDN 110 for a type of packet 112 transmitted to the data repository. In association with the high latency, the processing device 202 may detect the transmission failure 124 of a first packet 108*a* that can be the type of packet 112.

At block 304, the processing device 202 can identify, via debuggers 104*a-c*, functions 106*a-c* associated with the transmission failure 124 of the first packet 108*a* between components 102*a-c* in the SDN 110. The first component 102*a* can be a software switch, the second component 102*b* can be a hardware switch, and the third component 102*c* can be the data repository. In some examples, the debuggers 104*a-c* may detect data structures, segments of code, or other suitable identifiers of the functions 106*a-c* that indicate the functions 106*a-c* can be part of processing or transmitting the type of packet 112. For example, a packet buffer can be a data structure in functions 106*a-c* that can enable the functions 106*a-c* to receive and store the first packet 108*a*. Thus, the debuggers 104*a-c* can identify functions 106*a-c* by inspecting the functions 106*a-c* for the packet buffer.

Additionally, or alternatively, the processing device 202 can identify the type of packet 112 experiencing the transmission failure 124, and identify a second packet 108*b* that is also the type of packet 112. The processing device can determine a unique identifier 114 in the second packet 108*b* or the processing device 202 may apply a tracer to the second packet 108*b*. The processing device 202 can detect, by the debuggers 104*a-c* inspecting the functions 106*a-c*, the tracer 116 or the unique identifier 114. Thus, the processing device 202 may detect the transmission failure 124 of the first packet 108*a*, and, in response, the system 100 can identify functions 106*a-c* based on transmission of the second packet 108*b*.

At block 306, the system 100 can generate, via the debuggers 104*a-c*, log data 122 for the functions 106*a-c*. The log data 122 for each of the functions 106*a-c* can include a function name, a thread associated with the function, and a time. The log data 122 can be displayed for a user on a display device, such as the client device 118. In an example, function names for the functions 106*a-c* can indicate that the first function 106*a* forwards the type of packet 112, the second function 106*b* also forwards the type of packet 112, and the third function 106*c* enables the third component 102*c* to store the type of packet 112. The times in the log data 122 for the functions 106*a-c* can indicate an amount of time taken to forward the packets between components 102*a-c*.

At block 308, the processing device 202 can identify, based on the log data 122, a cause of the transmission failure 125 related to at least one of the functions 106*a-c*. The processing device 202 may identify the cause of transmission failure 125 by identifying errors 123 in the log data 122. The processing device 202 can determine, for each error 123, a cause of transmission failure 125 associated with the error based on a lookup table that associates the errors 123 with the causes of transmission failure 125. For example, a first amount of time between the execution of the first function 106*a* and the second function 106*b* and a second amount of time between the second function 106*b* and the third function 106*c* can be longer than an expected amount of time for transmitting the type of packet 112 to the data repository. The lookup table can include an error 123 with a threshold amount of time for a hardware switch to receive and transmit packets. For log data with times showing transmission through the hardware switch is longer than the threshold, the lookup table can associate the error 123 with a cause of transmission failure 125. The cause of transmission failure 125 may involve the hardware switch being outdated, which may prevent the hardware switch handling the transmission of the type of packet 112. Additionally, the processing device 202 may automatically provide the cause of transmission failure 125 to the user based on the log data 122 to enable efficient resolution of the transmission failure 124.

In some examples, the processing device 202 may determine a prioritization of log data 126 based on the cause of transmission failure 125. For example, times in the log data 122 that indicate the packet transmission was above the threshold can be highlighted or otherwise prioritized to generate a modified version of the log data 122. The processing device 202 may further display the modified version of the log data 122 to a user via the display device.

Additionally, or alternatively the system 100 may determine, based on the cause of transmission failure 125, at least one operation 132 that can be used to resolve the cause of transmission failure 125. The operation 132 can be based on historical data for resolving a related cause of transmission failure, a set of rules for resolving types of transmission failures, or otherwise determined by the failure detection engine 120. The operation 132 can be displayed to the user for use in resolving the transmission failure 124. In some examples, the operation 132 can be automatically implemented by a controller 136 or another suitable component of the SDN 110 to resolve the transmission failure 124. For example, the processing device 102 can determine an alternate route for the type of packet 112 that does not include the hardware switch. The controller 136 can automatically reroute the type of packet 112 based on the alternate route.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processing device; and a memory device that includes instructions executable by the processing device for causing the processing device to perform operations comprising:

detecting a transmission failure of a packet, the transmission failure occurring in a software-defined network;

identifying, via at least one debugger, a plurality of functions associated with the transmission failure of the packet between components in the software-defined network;

generating, via the at least one debugger, log data for the plurality of functions by:

detecting the transmission failure of the packet from a first component of the software-defined network to a second component of the software-defined network;

pairing a debugger with the first component or with the second component to generate the log data for a first function associated with sending the packet or for a second function associated with receiving the packet;

determining, based on the log data, whether the first function or the second function is responsible for the transmission failure; and identifying, based on the log data, a cause of the transmission failure related to the plurality of functions.

2. The system of claim 1, wherein the operation of identifying, via the at least one debugger, the plurality of functions associated with the transmission failure of the packet in the software-defined network further comprises:

identifying a type of packet experiencing the transmission failure; and identifying a second packet in the software-defined network that is the type of packet.

3. The system of claim 2, wherein the operations further comprise:

determining a unique identifier in the second packet; and detecting, via the unique identifier, the second packet to determine the plurality of functions associated with transmission of the second packet in the software-defined network.

4. The system of claim 2, wherein the operations further comprise:

applying a tracer to the second packet; and detecting, via the tracer, the second packet to determine the plurality of functions associated with transmission of the second packet in the software-defined network.

5. The system of claim 1, wherein the operations further comprise:

determining a prioritization of the log data based on the cause of the transmission failure; and displaying a modified version of the log data to a user via a display device, the modified version of the log data being based on the prioritization of the log data.

6. The system of claim 1, wherein the operations further comprise:

determining, based on the cause of the transmission failure, at least one operation usable to resolve the cause of the transmission failure; and displaying the at least one operation to a user via a display device.

7. The system of claim 6, wherein the operations further comprise automatically performing the at least one operation to resolve the cause of the transmission failure.

8. A method comprising:

detecting a transmission failure of a packet, the transmission failure occurring between at least two components of a software-defined network;

pairing at least one debugger with at least one of the at least two components of the software-defined network;

identifying, via the at least one debugger paired with the at least one of the at least two components, a plurality of functions associated with the transmission failure of the packet between the at least two components in the software-defined network;

generating, via the at least one debugger paired with the at least one of the at least two components, log data for the plurality of functions; and identifying, based on the log data, a cause of the transmission failure related to the plurality of functions.

9. The method of claim 8, wherein identifying, via the at least one debugger paired with at least one of the at least two components, the plurality of functions associated with the transmission failure of the packet in the software-defined network further comprises:

identifying a type of packet experiencing the transmission failure; and identifying a second packet in the software-defined network that is the type of packet.

10. The method of claim 9, further comprising:

determining a unique identifier in the second packet; and detecting, via the unique identifier, the second packet to determine the plurality of functions associated with transmission of the second packet in the software-defined network.

11. The method of claim 9, further comprising:

applying a tracer to the second packet; and detecting, via the tracer, the second packet to determine the plurality of functions associated with the transmission of the second packet in the software-defined network.

12. The method of claim 8, wherein generating, via the at least one debugger paired with the at least one of the at least two components, the log data for the plurality of functions further comprises:

detecting the transmission failure of the packet from a first component of the software-defined network to a second component of the software-defined network;

pairing a debugger with the first component or with the second component to generate the log data for a first function associated with sending the packet or for a second function associated with receiving the packet; and determining, based on the log data, whether the first function or the second function is responsible for the transmission failure.

13. The method of claim 8, further comprising:

determining a prioritization of the log data based on the cause of the transmission failure; and displaying a modified version of the log data to a user via a display device, the modified version of the log data based on the prioritization of the log data.

14. The method of claim 8, further comprising:

determining, based on the cause of the transmission failure, at least one operation usable to resolve the cause of the transmission failure; and displaying the at least one operation to a user via a display device.

15. A non-transitory computer-readable medium comprising instructions that are executable by a processing device for causing the processing device to perform operations comprising:

detecting a transmission failure of a packet, the transmission failure occurring between at least two components of a software-defined network;

pairing at least one debugger with at least one of the at least two components of the software-defined network;

identifying, via the at least one debugger paired with the at least one of the at least two components, a plurality of functions associated with the transmission failure of the packet between the at least two components in the software-defined network;

generating, via the at least one debugger paired with the at least one of the at least two components, log data for the plurality of functions; and identifying, based on the log data, a cause of the transmission failure related to the plurality of functions.

16. The non-transitory computer-readable medium of claim 15, wherein the operation of identifying, via the at least one debugger paired with the at least one of the at least two components, the plurality of functions associated with the transmission failure of the packet in the software-defined network further comprises:

identifying a type of packet experiencing the transmission failure; and identifying a second packet in the software-defined network that is the type of packet.

17. The non-transitory computer-readable medium of claim 16, wherein the operations further comprise:

determining a unique identifier in the second packet; and detecting, via the unique identifier, the second packet to determine the plurality of functions associated with transmission of the second packet in the software-defined network.

18. The non-transitory computer-readable medium of claim 16, wherein the operations further comprise:

applying a tracer to the second packet; and detecting, via the tracer, the second packet to determine the plurality of functions associated with the transmission of the second packet in the software-defined network.

19. The non-transitory computer-readable medium of claim 15, wherein the operation of generating, via the at least one debugger paired with the at least one of the at least two components, log data for the plurality of functions further comprises:

detecting the transmission failure of the packet from a first component of the software-defined network to a second component of the software-defined network;

pairing a debugger with the first component or with the second component to generate the log data for a first function associated with sending the packet or for a second function associated with receiving the packet; and determining, based on the log data, whether the first function or the second function is responsible for the transmission failure.

20. The non-transitory computer-readable medium of claim 15, wherein the operations further comprise:

determining, based on the cause of the transmission failure, at least one operation usable to resolve the cause of the transmission failure; and displaying the at least one operation to a user via a display device.

* * * * *